F. L. MacDONALD.
FOUNTAIN TOOTH BRUSH.
APPLICATION FILED NOV. 18, 1909.
965,309.
Patented July 26, 1910.
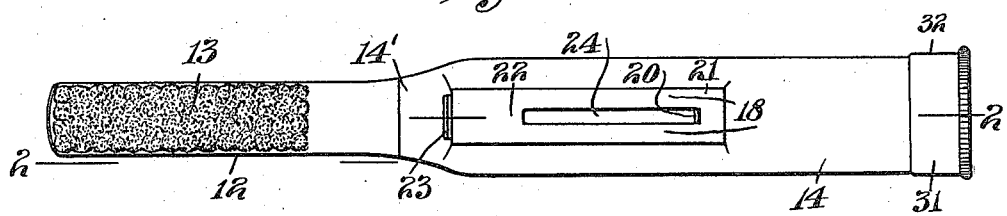
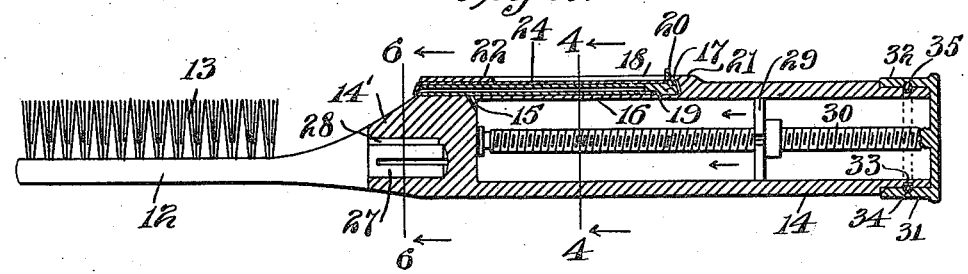
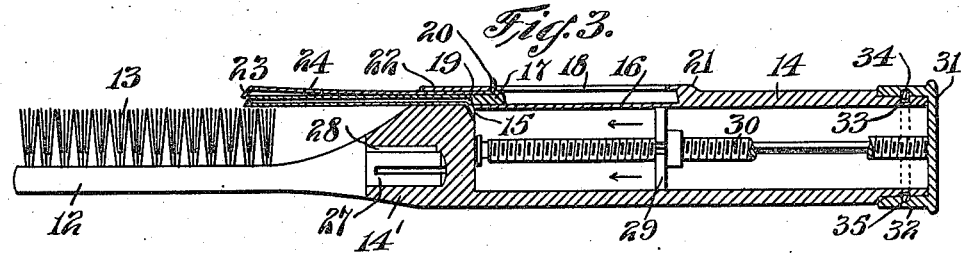
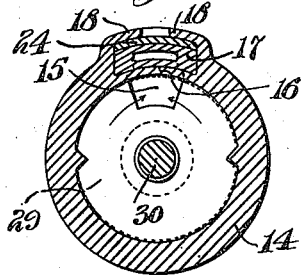
Witnesses:
P. W. Pizzetti
E. Batchelder
Inventor:
Frederick L. MacDonald;
By Wright Brown Quinby May
Attys.

UNITED STATES PATENT OFFICE.

FREDERICK L. MacDONALD, OF WALTHAM, MASSACHUSETTS, ASSIGNOR, BY DIRECT AND MESNE ASSIGNMENTS, TO DOMENIC CONTE, OF WALTHAM, MASSACHUSETTS.

FOUNTAIN TOOTH-BRUSH.

965,309.

Specification of Letters Patent. Patented July 26, 1910.

Application filed November 18, 1909. Serial No. 528,655.

*To all whom it may concern:*

Be it known that I, FREDERICK L. MAC-DONALD, of Waltham, in the county of Middlesex and State of Massachusetts, have invented certain new and useful Improvements in Fountain Tooth-Brushes, of which the following is a specification.

This invention relates to a tooth brush, the handle of which has a reservoir adapted to contain paste or other material for application to the bristles of the brush, and a movable nozzle adapted to be moved to position to discharge material from the reservoir upon the outer ends of the brush bristles.

The invention has for its object, first, to provide an improved construction whereby the movable nozzle is connected and disconnected from the interior of the reservoir by movements of the said nozzle, the latter communicating with the reservoir so that it conducts material therefrom when adjusted to position to deliver the material to the brush bristles, and closing the outlet of the reservoir to prevent escape of material therefrom when the nozzle is moved to an inoperative position.

The invention also has for its object to provide certain improvements relating to the means for detachably connecting the brush head or back with the reservoir handle, and in the means employed for forcing the material from the reservoir through the adjustable nozzle.

The invention consists in the improvements which I will now proceed to describe and claim.

Of the accompanying drawings, forming a part of this specification,—Figure 1 represents a side view of a fountain brush embodying my invention. Fig. 2 represents a longitudinal section on line 2—2 of Fig. 1. Fig. 3 represents a view similar to Fig. 2, showing the adjustable nozzle projected to deliver material to the brush bristles. Fig. 4 represents a section on line 4—4 of Fig. 2. Fig. 5 represents a side view of the spring coupling ring, hereinafter described. Fig. 6 represents a section on line 6—6 of Fig. 2.

The same reference characters indicate the same parts in all the figures.

In the drawings,—12 represents the head or back of a tooth brush, and 13 the bristles attached thereto in any suitable way.

14 represents an elongated tubular reservoir formed to constitute a handle for the brush, the handle being preferably detachably secured to the brush, as hereinafter described, so that a worn brush can be removed and a new one substituted for it. The reservoir 14 is adapted to contain a charge of tooth paste or other material intended to be used with the brush, and is provided with an outlet 15 for said material, said outlet extending through a face 16 formed upon one side of the reservoir.

17 represents a nozzle which is adapted to slide upon the face 16, the latter constituting one side of a guide in which the nozzle is movable from the retracted position shown in Fig. 2, to the projected position shown in Fig. 3, said guide also including flanges 18 which project over the outer side of the nozzle, as indicated in Fig. 4. The nozzle is provided at the inner portion of its inner side with a port or inlet 19 which coincides with the reservoir outlet 15 when the nozzle is projected, as shown in Fig. 3, thus permitting material to be forced from the reservoir through the nozzle upon the outer ends of the brush bristles, the arrangement being such that when the nozzle is projected, it overhangs the bristles forming the inner end portion of the brush. The inner side of the nozzle has a close sliding fit upon the reservoir face 16, so that when the nozzle is retracted, as shown in Fig. 2, it constitutes a valve which closes the outlet 15 and prevents the escape of material from the reservoir. The flanges 18 of the nozzle guide form the edges of a longitudinal slot through which an ear 20 on the nozzle projects, the ends of said slot being formed by portions 21 and 22 of the guide, which portions serve as stops to limit the sliding movements of the nozzle.

23 represents a valve adapted to close the delivering end of the nozzle, said valve being formed on a spring shank 24 which is attached to the inner end portion of the nozzle, and normally springs outward, as shown in Fig. 3, thus removing the valve from its operative position. When the nozzle is retracted, as shown in Fig. 2, the shank 24 is pressed inwardly toward the nozzle by the portion 22 of the guide, thus closing the outlet end of the nozzle.

The reservoir is provided with a solid end portion 14' in which is formed a circular socket 25 in one side of which is formed a groove 26. The brush back 12 is provided with a split shank 27 which is adapted to enter and spring outwardly against the wall of the socket 25, said shank having a spline 28 adapted to enter the groove 26. When the shank is inserted in the socket, the engagement of the spline with the groove prevents the brush back from turning, the outward pressure of the divisions of the split shank against the wall of the socket creating a sufficient frictional engagement between the shank and the socket to prevent accidental withdrawal of the shank from the socket. Provision is thus made for detachably securing the brush portion to the handle portion so that when the brush has become worn out, it may be removed and another substituted for it.

The reservoir is provided with means for forcing material from it through the outlet 15 and nozzle 17, said means including a follower or piston 29 which is movable in the reservoir, and has a screw threaded hub and an operating screw 30 extending lengthwise of the reservoir, and engaged with the hub of the follower, the screw being rotatable to cause the desired movement of the follower. The screw 30 is provided with a head 31 formed on or rigidly secured to the screw, said head having a flange 32 which surrounds the outer end portion of the reservoir, and has a close sliding fit thereon. The portion of the reservoir that is surrounded by the flange 32 has a peripheral groove 33 into which is sprung a split ring 34, the periphery of which projects outwardly from the groove 33, and is adapted to yieldingly engage a groove 35 formed in the interior of the flange 32. The ring 33 and groove 35 constitute coupling members adapted to yieldingly engage the operating screw with the reservoir, the sides of the groove 35 being curved or inclined, so that, on the application of sufficient force, the flange 32 may be withdrawn from the reservoir, the ring 34 being compressed inwardly to permit the withdrawal of the flange. When the flange is moved to place on the reservoir, the ring 34 first yields and is compressed until the groove 35 coincides with it, when the ring expands and engages the groove. The periphery of the head 31 may be milled or roughened to enable it to be conveniently grasped and turned.

While I have specified a brush adapted for cleaning teeth, it is obvious that my invention may be embodied in a brush adapted for other purposes, such as manicuring, shaving, etc., hence I do not limit myself to the uses to which a brush embodying my invention may be applied, nor to the particular form of the brush here shown.

I claim:

1. A fountain tooth brush having a handle formed as a reservoir, and provided with an outlet, a nozzle slidable on the reservoir and adapted to be projected toward the brush, said nozzle having an inlet which coincides with the reservoir outlet when the nozzle is projected, said outlet being closed by the nozzle when the latter is retracted, and means for forcing material from the reservoir through the projected nozzle.

2. A fountain tooth brush having a handle formed as a reservoir, and provided with an outlet, a nozzle slidable on the reservoir and adapted to be projected toward the brush, said nozzle having an inlet which coincides with the reservoir outlet when the nozzle is projected, said outlet being closed by the nozzle when the latter is retracted, a valve which is caused by movements of the nozzle to automatically open and close its outlet end, and means for forcing material from the reservoir through the projected nozzle.

3. A fountain tooth brush having a handle formed as a reservoir, and provided at one side with a guide which is substantially in alinement with the outer ends of the brush bristles, and with an outlet adjacent to said guide, a delivery nozzle slidably engaged with the guide and adapted to be projected toward the brush, said nozzle having at its inner end portion an inlet which coincides with the reservoir outlet when the nozzle is projected, the outlet being closed by the nozzle when the latter is retracted, and means for forcing material from the reservoir through the projected nozzle.

4. A fountain tooth brush having a handle formed as a reservoir, and provided at one side with a guide which is substantially in alinement with the outer ends of the brush bristles, and with an outlet adjacent to said guide, a delivery nozzle slidably engaged with the guide and adapted to be projected toward the brush, said nozzle having at its inner end portion an inlet which coincides with the reservoir outlet when the nozzle is projected, the outlet being closed by the nozzle when the latter is retracted, a valve adapted to close the outlet end of the nozzle and having a spring shank which is adapted to normally open the valve, and is displaced by the guide to close the valve when the nozzle is retracted, and means for forcing material from the reservoir through the projected nozzle.

5. A fountain tooth brush having a reservoir, a follower therein, an operating screw rotatable in the reservoir and provided with a flanged head, the flange of which surrounds a portion of the reservoir, and is provided with an internal groove, and a spring coupling ring engaged with an external groove in said portion, and adapted to yieldingly engage said internal groove.

In testimony whereof I have affixed my signature, in presence of two witnesses.

FREDERICK L. MacDONALD.

Witnesses:
C. F. BROWN,
P. W. PEZZETTI.